No. 840,686. PATENTED JAN. 8, 1907.
H. M. BROOK.
MACHINE FOR MAKING BAKING POWDERS.
APPLICATION FILED MAY 19, 1906.

3 SHEETS—SHEET 1.

Witnesses

Inventor
H. M. Brook
By
Attorneys

No. 840,686. PATENTED JAN. 8, 1907.
H. M. BROOK.
MACHINE FOR MAKING BAKING POWDERS.
APPLICATION FILED MAY 19, 1906.

3 SHEETS—SHEET 2.

Witnesses

Inventor
H. M. Brook
By
Attorneys

No. 840,686.
PATENTED JAN. 8, 1907.
H. M. BROOK.
MACHINE FOR MAKING BAKING POWDERS.
APPLICATION FILED MAY 19, 1906.
3 SHEETS—SHEET 3.
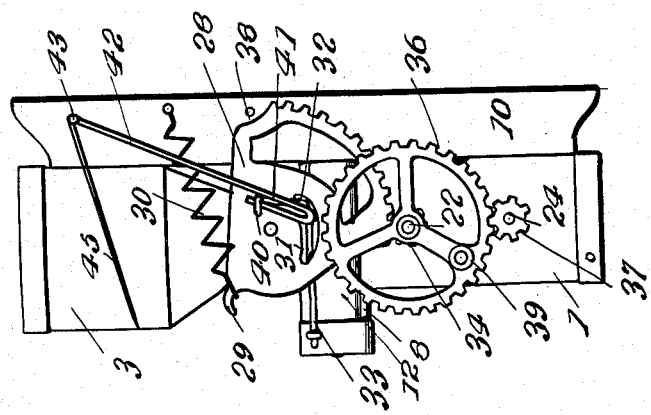
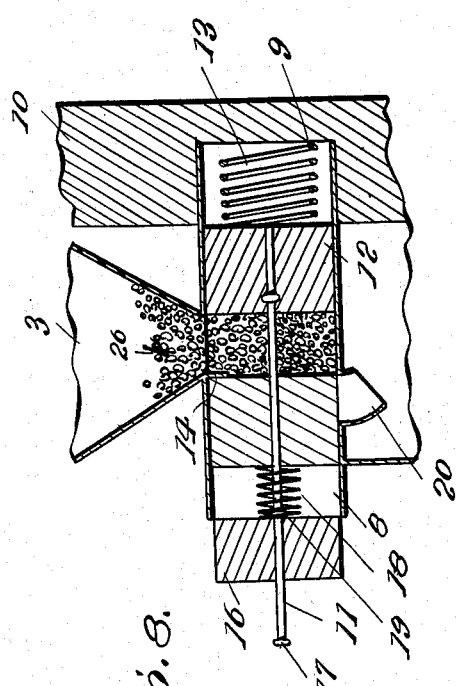
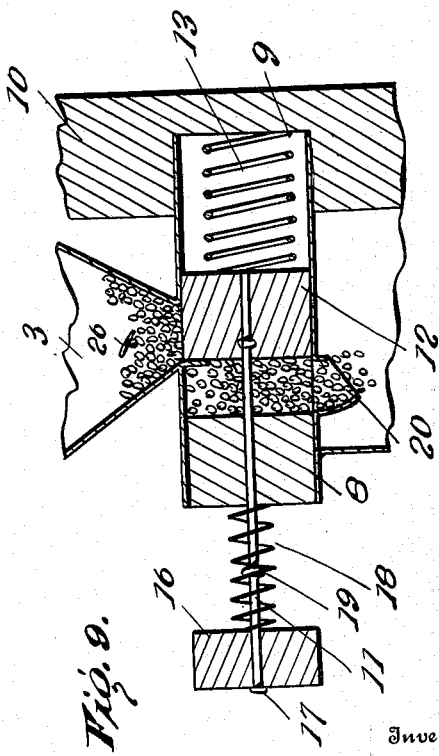
Witnesses
Inventor
H. M. Brook
By
Attorneys

UNITED STATES PATENT OFFICE.

HARLEY M. BROOK, OF SAGINAW, MICHIGAN.

MACHINE FOR MAKING BAKING-POWDERS.

No. 840,686.　　　　Specification of Letters Patent.　　　　Patented Jan. 8, 1907.

Application filed May 19, 1906. Serial No. 317,713.

*To all whom it may concern:*

Be it known that I, HARLEY M. BROOK, a citizen of the United States, residing at Saginaw, in the county of Saginaw and State of Michigan, have invented certain new and useful Improvements in Machines for Making Baking-Powders, of which the following is a specification.

This invention contemplates certain new and useful improvements in mixing-machines; and the object of the invention is to provide an improved machine or apparatus for making baking-powder, the machine being particularly designed for household or kitchen use, so that the housewife may in an efficient and expeditious manner mix for herself the proper ingredients to produce a baking-powder, being thereby insured that the resultant mixture shall be free from starch or alum or other adulterants which are so commonly employed in baking-powder for commercial use.

While the invention is particularly designed for the above purpose, it is to be understood that the mechanism is adaptable for mixing various ingredients other than those necessary to produce baking-powder and that the constructions, arrangements, and combinations of parts may be embodied in an apparatus for any purpose where the commingling and thorough agitation of two or more substances are desired.

The invention also contemplates an improved construction and arrangement of parts whereby an exact predetermined amount of each desired ingredient may be fed from the compartments containing the same to the mixing or agitating device, the parts being so arranged that a pointer will indicate what amount of each substance is being discharged from the respective compartments of a suitable magazine or storage-reservoir.

For a full description of the invention and the merits thereof and also to acquire a knowledge of the details of construction of the means for effecting the result reference is to be had to the following description and accompanying drawings, in which—

Figure 3:
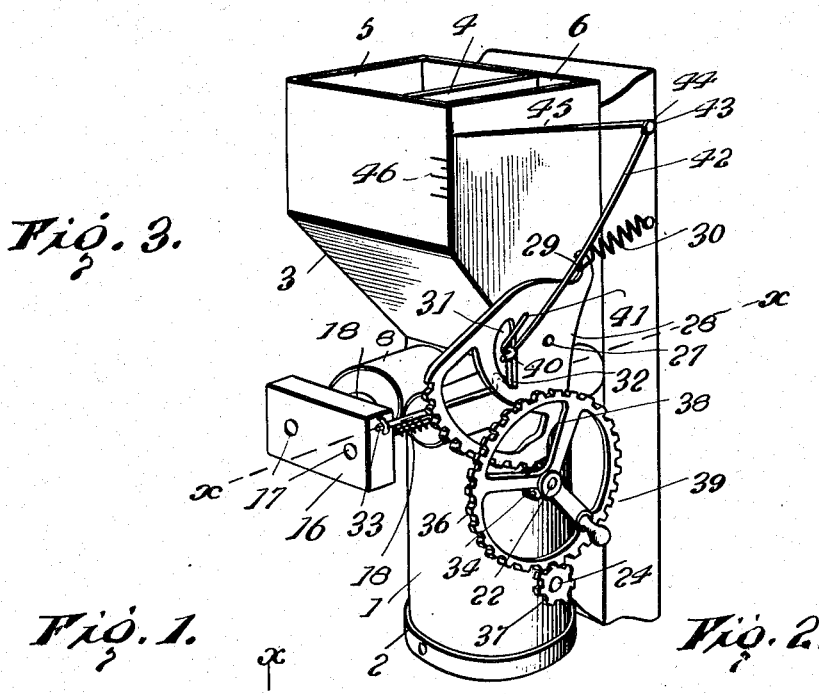
Figure 1:
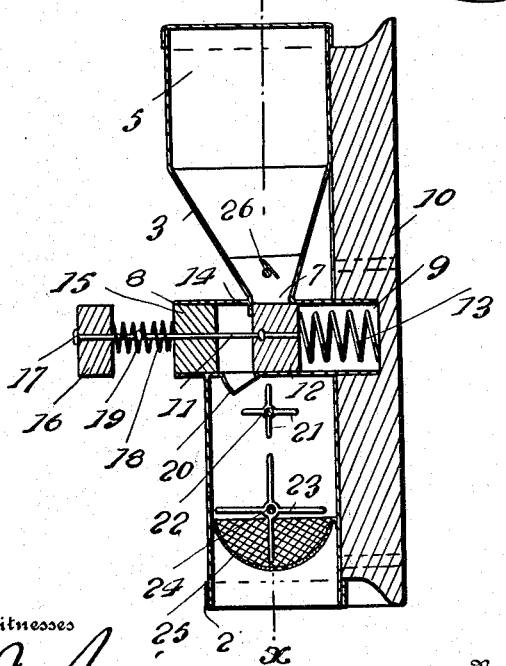
Figure 2:
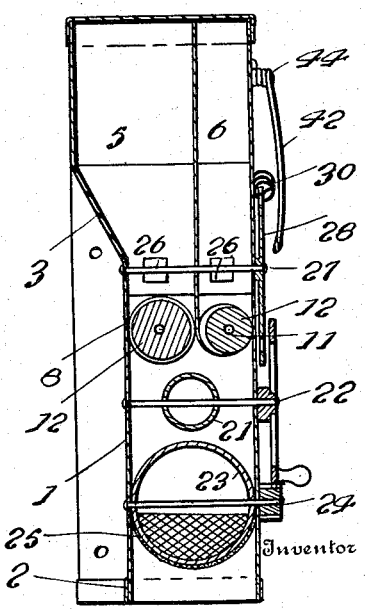
Figure 4:
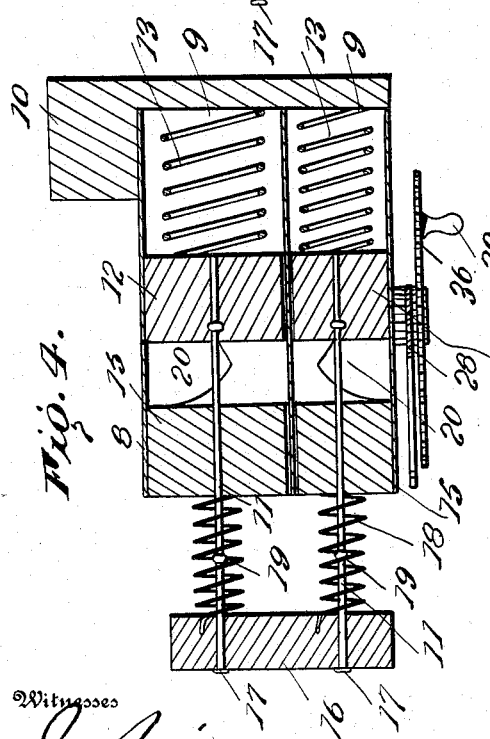

Figure 1 is a transverse vertical section of my improved mixing-machine. Fig. 2 is a longitudinal section thereof. Fig. 3 is a perspective view. Fig. 4 is a horizontal sectional view on the line *x x* of Fig. 1. Figs. 5, 6, 7, 8, and 9 are detail vertical sections illustrating parts in different positions in the several views. Fig. 10 is a side elevation.

Corresponding and like parts are referred to in the following description and indicated in all the views of the drawings by the same reference characters.

The body portion 1 of my improved mixing apparatus is in the present instance in the form of a cylinder designed to house the mixing devices, hereinafter described, and provided at its bottom with a receiver 2 in the form of a tray or cup, which closes the lower end of the body portion 1 and is designed to receive the mixed materials, so that they may be carried from the apparatus and applied to the desired use. The body portion 1 is surmounted by a hopper 3, the two together constituting the casing of the apparatus, and the hopper 3 is divided by a partition 4 into two compartments, (designated 5 and 6, respectively.) While any number of these compartments may be employed, according to the use to which the apparatus is to be put, in the present instance only two are used, compartment 5 being larger than the compartment 6 and the larger compartment being intended for cream of tartar, while the smaller compartment is intended for bicarbonate of soda. Each of the compartments 5 and 6 is provided at its lower end with a discharge-opening 7, leading to a horizontally-extending cylinder 8, which is seated, preferably at its rear end, in a socket 9 in a supporting-plate 10, which in the present embodiment of the invention is so arranged as to be attached to the wall or the like to support the entire apparatus. There are two of these cylinders 8, one for each compartment, and they are arranged side by side, as shown. As both cylinders and their concomitant parts are substantially alike except in the proportion of the parts, it will be sufficient to describe but one of them.

Figure 6:
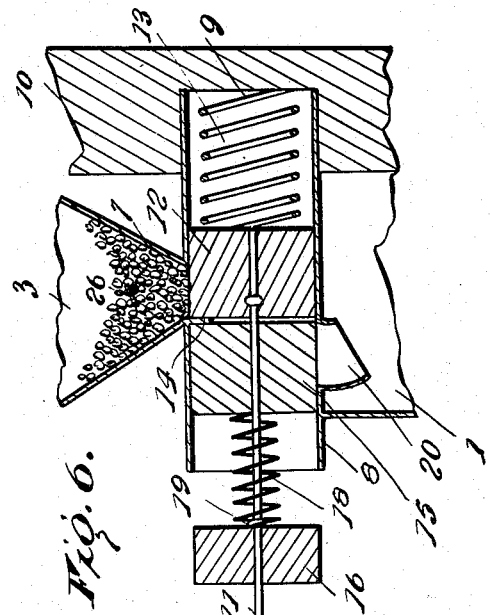
Figure 5:
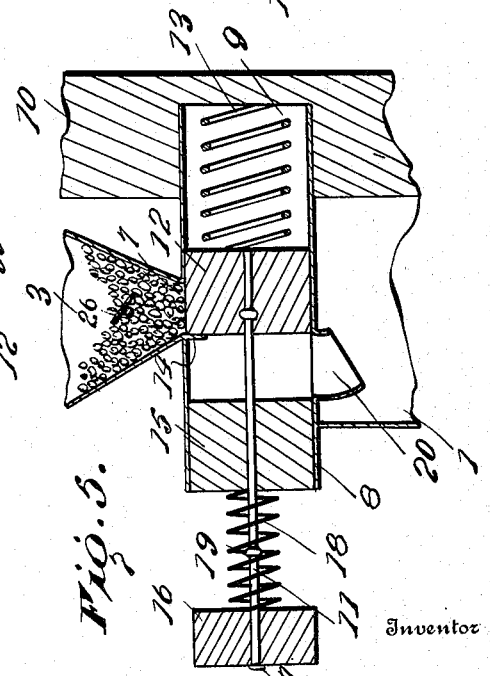

In the cylinder 8 there is mounted a rod 11, to which a plunger 12 is fixed. Interposed between the plunger 12 and the rear end of the cylinder is an expansion-spring 13, always under sufficient tension to press the plunger 12 up against a stop device 14, which in the present instance is a depending flange at the front side of the discharge-opening 7. 15 designates another plunger, which is mounted to slide on the rod 11 in front of the plunger 12, and 16 designates an actuating-plate or thumb-piece mounted to slide on the outer end of the rod 11. An expansion-spring 18, hooked into 16 and 15, holding them together as well as apart, is interposed between the plunger 15 and the actuating-plate 16, the tension of the spring acting to press the two apart, and the outer movement of the actuating-plate 16 is limited by a knob 17 on the rod 11. As indicated in the detail horizontal sectional view Fig. 4, the actuating-plate 16 extends from one rod 11 to the other and is mounted upon both of said rods. 19 designates a protuberance or swell upon the rod 11, said swell being designed to limit the inward movement of the plate 16 upon the rod 11. Describing now the operation of this portion of the apparatus, reference is to be particularly had to Figs. 5 to 9, inclusive. The parts shown in Fig. 5 are in their normal positions, in which the spring 13 is holding the fixed plunger 12 against the flange 14 and across the outlet-opening 7, while the spring 18 is pressing the plate 16 out against the knob 17 and is holding the plunger 15 at the outer end of the cylinder, it being understood that the spring 18 is hooked into the parts 15 and 16. To discharge the ingredients from the hoppers, the operator presses upon the actuating-plate 16, which first moves said plate inwardly until its independent movement on the rod 11 is arrested by the swell 19 on said rod, and said movement of the plate 16 will, it is manifest, slide the plunger 15 inwardly also until it brings up against the flange or stop 14. This position is shown in Fig. 6, and up to this point there has been no movement of the plunger 12, the latter remaining in position to close the discharge-opening 7. A further movement of the actuating-plate 16 in an inward direction will move the rod 11 inwardly also on account of the contact between the plate 16 and the swell 19, and this, it is evident, will result in moving the plunger 12 inwardly against the action of ist spring 13 to open the discharge-opening and allow the ingredients to flow into the space between the plungers 12 and 15. This space is produced owing to the fact that the plunger 12 may move inwardly, as just described, while the inward movement of the plunger 15 beyond the front edge of the discharge-opening is prevented by its contact with the flange or stop 14. The parts will now be in either the position shown in Fig. 7 or that shown in Fig. 8, according to the degree of movement of the actuating-rod 11. As soon as this movement has been accomplished to fill the space between the two plungers the plate 16 is released, and both of the plungers 12 and 15 will be moved outwardly in their spaced-apart relation, owing to the space between them being filled with the ingredients. It is of course understood that the entire movement of both plungers in an outward direction to return them to their normal positions is effected by the spring 13, which finally brings the plunger 12 up against the inner side of the stop or flange 14, while the spring 18 serves the purpose of moving the thumb-piece or actuating-plate 16 out against the knob 17 to its initial and normal position.

In the return movement of the plungers above described the ingredients in the space between the two plungers will be carried into registry with the discharge-opening 20 in the bottom of the cylinder, and the ingredients from both cylinders will thus be simultaneously dropped to the revoluble mixing device 21, mounted on a transverse shaft 22, journaled in the cylindrical body portion 1, and from thence the mixed ingredients will flow to a second revoluble mixing device 23, mounted upon another transverse shaft 24. The upper and lower mixing devices are both in the present instance constituted by rings, as clearly illustrated in the drawings, and the lower mixing device is arranged in connection with a sieve 25, mounted in the body portion 1, and is designed to scrape the mixed materials through the sieve into the cup 2. In the lower end of both compartments 5 and 6 of the hopper 3 are located agitating-blades 26, mounted upon a shaft 27 and designed to agitate the material as it is discharged from the compartments and prevent the same from becoming caked. Also mounted upon the shaft 27 is a toothed segment 28, provided at one end with a hook 29, by which it is connected to one end of a spring 30, the other end of said spring being secured to any stationary part, such as a side of the supporting-plate 10. The segment 28 is provided with an opening 31, through which projects a shoulder 32 of a rod 33. The rod 33 is connected at one end to the actuating-plate 16. By this means the rod 33 is moved inwardly when the plate 16 is pressed upon, and as it moves inwardly the engagement between its shoulder 32 and the wall of the opening 31 in the segment 28 will swing said segment about the shaft 27 as an axis. The return movement of the segment is accomplished by means of the spring 30. The teeth of the segment 28 are adapted to mesh with a pinion 34, mounted on the outer end of the shaft 22, and said shaft also carries a larger gear-wheel 36, which meshes with a pinion 37 on the outer end of the shaft 24.

From the foregoing description it will be seen that as the plate 16 is pressed inwardly to effect the discharge of the predetermined amount of ingredients into the body portion 1, which constitutes the casing for the mixing devices, the said inward movement will by means of the actuating-rod 33 swing the segment 28 and cause the rotation of the pinion 34 and its shaft 22 to rotate the upper mixing device 21, while at the same time the movement of the pinion 34 and its shaft 22 will in turn rotate the larger gear-wheel 36, which will cause a more rapid rotation of the lower mixing device 23. The segment 28 is provided at one corner with a recess 38 devoid of teeth, and its movement in the return direction as it is pulled back by its spring 30 is such that this recess will at the limit of such movement be brought opposite the pinion 34. Hence the segment 28 will be carried entirely out of mesh with the pinion 34, and the wheel 36 may then be turned by hand (for which purpose it is provided with a handle 39) to effect the further rotation of the mixing devices independently of the mechanically and automatically operating means constituted by the spring-actuated segment.

Figure 7:
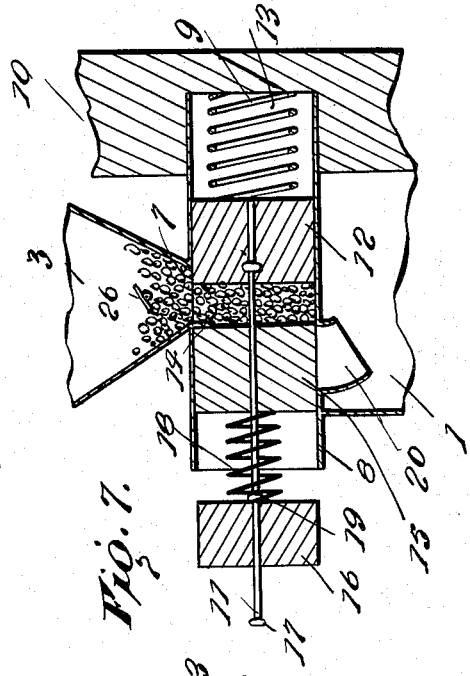

It is one of the important features of this invention that means be provided to determine always just what amounts of the several ingredients are being discharged from the respective compartments. For this purpose I provide the actuating-rod 33 with another shoulder 40, which engages a hook 41 on one end of a bell-crank lever 42, fulcrumed on a stud 43 and having a return-spring 44 wound about its axis. The arm 45 of the bell-crank constitutes a pointer which extends alongside of the hopper 3 toward the front thereof and is adapted to register with different graduations 46 on the front of the hopper. For instance, the main graduations, which are here shown as three in number, may indicate a heaping teaspoonful, a level teaspoonful, and a rounding or half teaspoonful, respectively. It will thus be seen that by means of the engagement of the shoulder 40 with the hooked end 41 of the bell-crank 42 the inward movement of the plate 16 will carry the pointer 45 downwardly to one or the other of the graduations proportionately to the inward movement of the actuating-plate 16 and proportionately also to the inward movement of the plunger 12. As indicated in Fig. 8, the actuating-plate 16 has been moved inwardly as far as possible to carry the plunger 12 completely away from the discharge-opening 7 to discharge the largest amount of the materials of which the apparatus is capable. As illustrated in Fig. 7, the actuating-plate 16 has been moved only partially inward, and accordingly the space between the plunger 12 and the plunger 15 is not so large, and a smaller amount of the materials will thus be discharged.

From the foregoing description in connection with the accompanying drawings it will be seen that I have provided an improved apparatus of this character in which the amounts fed from the hoppers or the compartments thereof may be determined to an accurate degree, and whereby the agitation, the discharge, and the thorough commingling of the ingredients is effected by merely pressing in the actuating-plate 16, the parts being then automatically returned to their normal positions. By the provision of the segment 28 and the arrangements by which it is carried completely out of engagement with the pinion 34 it is obvious that the mixing devices 21 and 23 may be operated by hand independently of the mechanical actuating devices for such parts, so that the mixing of the materials may be carried on as long as there remains any to be scraped through the sieve 25.

In referring to the parts 8 in the following claims as "cylinders" it is to be understood that this term is not limited strictly to a structure of cylindrical formation, but is to be given the meaning of a casing or housing for the plungers, no matter of what shape such housing may be.

Having thus described the invention, what is claimed as new is—

1. In an apparatus of the character described, the combination of the hopper divided into compartments having separate discharge-openings, cylinders arranged side by side beneath the hopper, plungers in each of said cylinders, the plungers being adapted to control said discharge-openings, each cylinder being provided with a discharge-opening, a rod rigidly secured to a plunger of each cylinder, an actuating-plate mounted on both of said rods and arranged to move the rods and plungers simultaneously in one direction, and springs adapted to move said plungers and rods in the opposite direction.

2. In an apparatus of the character described, the combination of a hopper provided with a discharge-opening, a cylinder mounted underneath said discharge-opening and also provided with a discharge-opening, a plunger mounted in said cylinder and adapted to close the discharge-opening of the hopper, a rod to which said plunger is rigidly secured, another plunger mounted to move on said rod, means for moving the movable plunger independently of the rigid plunger, and means for moving both of said plungers together.

3. In an apparatus of the character described, the combination of a hopper provided with a discharge-opening, a plunger adapted to close said discharge-opening, a cylinder in which said plunger works, a rod on which said plunger is rigidly secured, another plunger movable on said rod, means for moving said last-named plunger toward the first-named plunger, and means for limiting the independent movement of the plungers.

4. In an apparatus of the character described, the combination of a hopper provided with a discharge-opening, a plunger adapted to close said opening, a cylinder in which said plunger works, a rod on which said plunger is rigidly secured, a plunger slidable on said rod, an actuating-plate also slidable on said rod, a spring interposed between and secured to the slidable plunger and the actuating-plate, and means for limiting the sliding movement of said plate and slidable plunger in one direction on the rod, as and for the purpose set forth.

5. In an apparatus of the character described, the combination of a hopper provided with a discharge-opening, a plunger adapted to close said opening, a cylinder in which said plunger works, means for automatically moving said plunger to its closed position, a stop device adapted to limit this movement of the plunger, a rod on which said plunger is rigidly mounted, a slidable plunger mounted on said rod and also adapted to contact with said stop devices to limit its slidable movement in one direction, an actuating-plate also slidably mounted on said rod, means for pressing said actuating-plate and slidable plunger apart, and means for limiting the independent movement of said slidable plunger and actuating-plate on the rod.

6. In an apparatus of the character described, the combination of a hopper provided with a discharge-opening, a plunger adapted to close said opening and to be moved away from said opening to permit the materials to be discharged therefrom, a cylinder in which said plunger works, a rod on which said plunger is secured, another plunger slidable on said rod, an actuating-plate slidably mounted on the outer end of said rod, and a spring interposed between said actuating-plate and slidable plunger adapted to press the same apart, the rod being provided with a swell adapted to limit the movement of the actuating-plate in one direction.

7. In an apparatus of the character described the combination of a hopper provided with a discharge-opening, a plunger adapted to close said opening, a cylinder in which said plunger works, a rod on which said plunger is fixedly held, another plunger adapted to slide on said rod, and means for limiting the inward movement of said slidable plunger at a point on one side of the discharge-opening, whereby the continued movement of the actuating-rod will move the plunger that is fixedly held thereon more or less away from said opening to permit the ingredients to discharge into the space thus produced.

8. In an apparatus of the character described the combination of a hopper provided with a discharge-opening, a plunger adapted to close said opening, a cylinder in which said plunger works, a rod on which said plunger is fixedly held, another plunger adapted to slide on said rod, means for automatically limiting the movement of said slidable plunger whereby the continued movement of the other plunger and rod will open up a space between the two plungers, and means for determining the size of said space, according to the desired amount of material to be discharged.

9. In an apparatus of the character described, the combination of the hopper provided with a discharge-opening, the plungers adapted to control said opening, a cylinder in which said plungers work, said cylinder being provided with a discharge-opening, the mixing devices mounted below the opening in the cylinder in the path of the material dropping therefrom, means for actuating said plungers, means for actuating the mixing devices through the operation of the plunger-actuating means, and means for actuating the mixing devices independently of the plunger-actuating means.

10. In an apparatus of the character described, the combination of the hopper, the plungers adapted to control the feed of material from said hopper, the cylinders in which said plungers work, said cylinders being provided with a discharge-opening, a toothed segment, actuating means for the plungers also arranged to operate said segment, the mixing devices underneath the discharge-opening of the cylinder, and means whereby the segment will actuate said mixing devices.

11. In an apparatus of the character described, the combination of the hopper, the plungers adapted to control the discharge of material from said hopper, a cylinder in which said plungers work, said cylinder being provided with a discharge-opening, mixing devices, a toothed segment designed to actuate said mixing devices, means for actuating said plungers, said means being arranged to also actuate said segment, a shaft upon which said segment is pivoted, and an agitating device mounted on said shaft.

12. In an apparatus of the character described, the combination of the hopper, the plungers adapted to control the feed of material from said hopper, cylinders in which said plungers work, said cylinders being provided with discharge-openings, a receiving-cylinder underneath the cylinders of the plungers, mixing devices mounted in such cylinder, means for actuating said plungers, a toothed segment, the actuating means for the plungers being operatively connected to said segment to turn the same, means whereby the actuation of the segment will operate the mixing devices, and a sieve underneath said mixing devices.

13. In an apparatus of the character described, the combination of the hopper, the plungers adapted to control the discharge of material from said hopper, the cylinder in which said plungers work, said cylinder being provided with a discharge-opening, mixing devices underneath the discharge-opening of said cylinder, a segment adapted to actuate said mixing devices, an actuating-plate for said plungers, and an arm connected to said actuating-plate and adapted to engage said segment to move the same, as and for the purpose set forth.

14. In an apparatus of the character described the combination of a hopper, plungers arranged to control the discharge of material from said hopper, mixing devices, a segment adapted to actuate said mixing devices and provided with an opening, an actuating-plate for said plungers, a rod connected to said actuating-plate and provided with a shoulder entered in said opening and adapted to move said segment, the segment being provided at one end with a hook, and a returning-spring connected to said hook.

15. In an apparatus of the character described, the combination of a hopper, plungers adapted to control the discharge of material from said hopper, the cylinder in which said plungers work, a movable actuating-plate designed to move said plungers, a rod connected to said plate and movable therewith, a bell-crank lever having one end operatively connected to said rod whereby the movement of the actuating-plate will effect a movement of the bell-crank, the other end of said bell-crank constituting a pointer adapted to indicate the amounts of materials fed by said plungers, the cylinders being provided with discharge-openings controlled by said plungers, and a tray underneath said discharge-openings and adapted to receive the material therefrom.

16. In an apparatus of the character described, the combination of a hopper provided with a discharge-opening, a cylinder mounted underneath the discharge-opening of the hopper and in communication therewith, said cylinder being provided with a discharge-opening out of alinement with the discharge-opening of the hopper, a plunger in said cylinder and adapted to cut off the discharge-opening of the hopper, another plunger movable in the cylinder, means whereby the cut-off plunger may be moved away from the opening in the hopper, and means for limiting the movement of the other plunger at a point on one side of the discharge-opening of the hopper, whereby a space between the two plungers will be produced into which space the material from the hopper may fall, and means for moving both of said plungers simultaneously toward and into registry with the discharge-opening in the cylinder, whereby the material held in the space between the two plungers, will fall through the discharge-opening in the cylinder and one of said plungers will be brought back into position to cut off the discharge-opening of the hopper.

In testimony whereof I affix my signature in presence of two witnesses.

HARLEY M. BROOK. [L. S.]

Witnesses:
PHIL. HUBER,
HUBERT R. CORNISH.